July 16, 1968   R. J. LOCKER ET AL   3,393,315
HIGH-SPEED, HIGH SENSITIVITY, IONIZING RADIATION DETECTOR
Filed Oct. 6, 1965   2 Sheets-Sheet 1

INVENTOR.
GERALD C. HUTH
BY ROBERT J. LOCKER

INVENTOR.
GERALD C. HUTH
ROBERT J. LOCKER
BY 3,393,315
HIGH-SPEED, HIGH SENSITIVITY, IONIZING RADIATION DETECTOR
Robert J. Locker, King of Prussia, and Gerald C. Huth, Rosemont, Pa., assignors to the United States of America as represented by the United States Atomic Energy Commission
Filed Oct. 6, 1965, Ser. No. 493,594
1 Claim. (Cl. 250—83.3)

ABSTRACT OF THE DISCLOSURE

Radiation detector having a semiconductor for producing electrical signals corresponding to the energy of incident radiation and a small, compact, low power requirement tunnel diode for amplifying the signals whereby the detector can be used for the portable detection of low energy radiation.

---

This invention relates to high speed radiation detection and more particularly to the high speed detection of minimum charges produced in passing ionizing charged particles into an internally amplifying contoured semi-conductor by combining the semiconductor with an integral tunnel diode. The invention described herein was made in the course of, or under, a contract with the United States Atomic Energy Commission.

In the field of physics, high speed detectors are required for measuring the energy spectra of ionizing charged particles. One apparatus using such detectors is the 33 bev. accelerator known as the Alternating Gradient Synchrotron at the Brookhaven National Laboratory described, for example, in U.S. Patent 2,882,396. In this machine, high energy charged particle projectiles bombard various targets inside and outside the accelerator to produce a broad range of ionizing charged particles having a wide range of energies, which have to be detected and identified. Moreover, since these particles are produced in locations where large magnetic fields are present, are transported in systems having strong magnetic transport fields or are produced in bubble chambers having large magnetic analyzing fields it is desirable to provide detectors that are unaffected by these high fields.

Heretofore extremely high speed detection (in the nano or $10^{-9}$ second) regime has been accomplished with scintillator crystal-photomultiplier tube combinations. This system, however, has to be shielded from the magnetic fields. Moreover, it becomes marginal when the signal becomes small, generally occasioned by low energy particles. Moreover, the new semiconductor detectors, although inherently possessing greater speed and the ability to detect low energy particles, are unuseable because of the necessity for slow external amplification.

In accordance with this invention, this problem with semiconductor detectors is solved by extremely high speed amplification within the semiconductor crystal and the use in combination therewith of the equally fast tunnel diode, thus permitting detection in the sub-nanosecond regime over a low energy range that has heretofore been unmeasurable. In one embodiment the novel features of this invention provide a capability of detecting low energy particles coupled with an ability to resolve ionization event pairs separated by 200 nanoseconds (i.e. 5 mc. repetition rate).

It is an object of this invention, therefore, to provide an instrument for detecting ionizing radiation to extremely low energies at extremely high resolving times and to give a digitally acceptable signal to represent the detection of the event.

It is also an object to provide a single, compact, practical device to detect a charge of about $10^{-14}$ coulombs in a charge limited system;

It is a further object to combine the high speed logic decision ability of a tunnel diode with the detection ability of a charge multiplying contoured detector to detect charges of $2.3 \times 10^{-16}$ coulombs without an increase in circuit noise;

It is a further object to provide a radiation detector, comprising a contoured semi-conductor detector and a tunnel diode, wherein the signal to noise ratio before charge multiplication is enhanced by the charge multiplication process so that the detector delivers to the tunnel diode circuit a charge signal raised above the noise background by the amount of the multiplication, up to 43 to 1 in amplitude or more.

The above and further novel features and objects of this invention will appear more fully from the following detailed description when the same is read in connection with the accompanying drawings. It is to be expressly understood, however, that the drawings are not intended as a definition of the invention, but are for the purposes of illustration only.

In the drawings where like parts are numbered alike:

Figure 1:
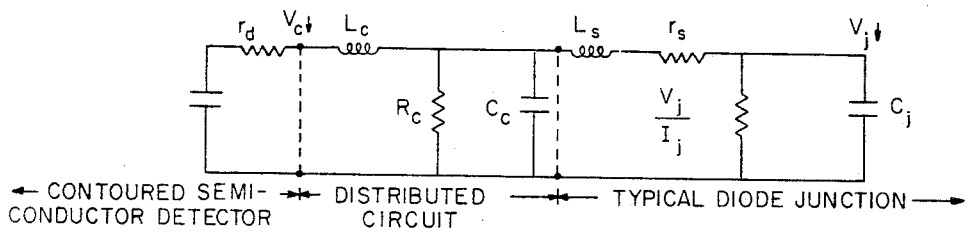
FIGURE 1 is a partial equivalent circuit for elements of an input junction of a semi-conductor device.

The system of this invention utilizes the contoured detector described in U.S. patent application S.N. 257,935, filed on Feb. 12, 1963, on a Semiconductor Charged Particle Detector by Gerald C. Huth, now U.S. Patent 3,293,435, which is of interest particularly in detection and spectroscopy of low energy charged particle electromagnetic radiation. This detector, comprises a silicon p+n arrangement having a beveled junction with a shallow angle $\theta$, typically 2–5°. Silicon or germanium in a p+n or n+p arrangement may be used, however. A reverse bias is applied to the junction causing a space charge region to spread through the base and because the electric field in a semiconductor must be normal to the surface thereof (in the absence of surface charges) the space charge region must distort. The geometry of the junction, therefore, and the distortion effect result in a very large surface space charge region into which very low energy radiation can be introduced directly. This has produced pulses corresponding in amplitude to the particle energy and these pulses have been fed to charge amplifiers that have employed a charge feedback amplifier system. The response speed of these amplifiers, however, has been limited to ≈150 kc. operation. In this regard the semiconductor detectors have had small capacitance values but the slow amplifier response has required that the detected charge must be stored in a high impedance circuit for analysis. Moreover, these charge amplifier systems have been complex and have required a large volume, weight and power.

The problems with slow speed or complicated amplifiers is overcome in accordance with this invention by the use of tunnel diodes coupled directly to the contoured detector. In this regard the tunnel diode exhibits a unique combination of electrical properties, comprising negative resistance over part of its operating voltage range. Thus it has amplifying abilities. It also has switching ability from 10 to 100 times as fast as the fastest transistor. It additionally resists nuclear radiation damage more than 1000 times better than transistors. Like the conventional semiconductor diodes it can be utilized in high magnetic fields. In operation, when a forward bias voltage is applied, the tunnel diode goes out of its positive resistance region and into its negative resistance region where the current falls to a small level. The conduction band to valence band current that flows with the forward bias is the Esaki current.

The tunnel diode takes its name from the tunnel effect—a process wherein a particle (obeying the law of the quantum theory) can disappear from one side of a potential barrier and appear instantaneously on the other side, even though it does not have enough energy to surmount the barrier. This operation is as though the particle can tunnel underneath the barrier. This barrier is the space charge depletion region of a p-n junction and is the same barrier that prevents the current from flowing in the reverse direction in the case of the ordinary rectifier diode. In the tunnel diode, this barrier is extremely thin (less than one millionth of an inch) and is so thin that penetration by means of tunneling becomes possible. This gives rise to an additional current in the diode at very small forward bias which disappears when the bias is increased. It is this additional current, called the Esaki current, that produces the negative resistance in the tunnel diode as described in "Electronics Industries," August 1959, vol. 18, No. 8, pp. 82–83, 182 and 184–187. Suitable materials comprise silicon, germanium, gallium arsenide, gallium antimonide, and indium antimonide made by the General Electric Co. and the R.C.A. It is a tunnel diode of this type that is used in this invention.

In understanding the principles of this invention, a small discrete coulomb charge is supplied to a tunnel diode by a contoured semiconductor whereby the inherent extremely fast decision mechanism of the tunnel diode changes its logic state upon the detection of the small discrete coulomb charge supplied by the semiconductor. To this end, the tunnel diode device must have a small input capacitance so that the charge transfer process is obtained with a small degradation of circuit voltage. The speed of decision and small capacitance will be understood, from FIGURE 1, which shows the equivalent circuit elements of a typical contoured diode, diode junction and distributed circuit.

Figure 2:
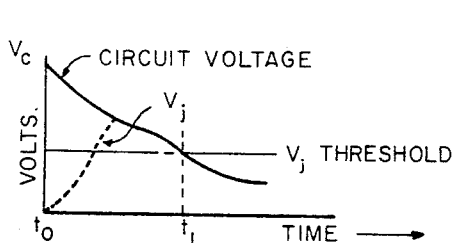
FIGURE 2 is a graphic illustration of volts vs. time in a semi-conductor junction device having a threshold voltage for junction current to flow, showing the relation of this to the circuit voltage and circuit charge.

At time $t_0$, the capacitance of the semiconductor is initially charged to a voltage $V_0 = Q/C_{det}$. At some time, $t_1$ (due to the time delay caused by $r_d$, $L_c$) the circuit voltage is $$V_t = \frac{Q}{C_{det} + C_j}$$

assuming that the leakage paths, $R_c$ and $C_c$, are nonexistent. The typical semiconductor junction device has a threshold voltage for junction current to flow, and this may be related to the circuit voltage and circuit charge as illustrated in FIG. 2.

This $$V = \frac{Q}{C} = \frac{\int i dt}{C}$$

diagram is illustrative of a typical circuit voltage, junction capacitance, and device impedance relationship. With a small junction capacitance and a large device impedance, the voltage droop will have a long time constant, and a slow decision making device is tolerable as long as the event happens before the circuit voltage drops to the $V_j$ value at which time the junction no longer conducts.

Figure 3:
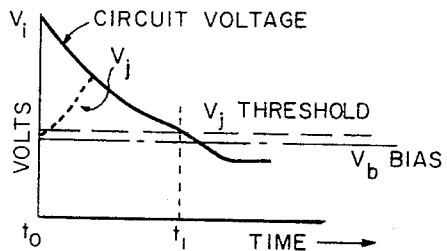
FIGURE 3 is a graphic illustration of FIGURE 2 showing the enhancement of charge detection by biasing the junction to a preselected level.

Charge detection can be enhanced by biasing the junction to a preselected voltage level. This is illustrated in FIG. 3. The required charge in the detector ($C_{det}$) capacitor to change the logic level of the device has been reduced by the pre-biasing of the junction. The length of time the current into the device must continue to flow for a change in logic state and its magnitude is a direct indication of the charge sensitivity of the device, $Q = \int i dt$. In the above, the series inductance, stray capacitance and leakage impedance paths all detract from the concept of minimum charge detection.

The physical constraints on junction capacitance and logic decision time discussed above can be applied to a conventional semiconductor junction device, such as the Motorola 2N2493. This semiconductor has junction capacitances of less than 1 pf. However, the switching mechanism relies on minority carrier diffusion and the base drive must continue for a long period of time before the output $I_c$ current will change even a small amount (such as 10μ amps). When the base drive is removed, the transistor returns to its original logic state. Thus, unless the device is coupled with another active device, it will not retain its new logic state. The practicality of biasing the junction to a predetermined voltage level for a definite charge sensitivity is difficult since the $I_c$ vs. $V_{BE}$ junction characteristics are very temperature and radiation sensitive.

Should a tunnel diode be used, the diode tunneling mechanism takes place at near the speed of light. The fact that its terminal voltage does not switch at this speed is due to the physical electrical properties of junction capacitance and finite negative conductance. The requirement that a voltage change must take place across this capacitance gives the rise time the value $$t_r = \frac{C_j \int_{V_1}^{V_2} dV}{\int i_c di}$$

Depending on the method of bias, the new logic state is permanent with the trigger charge pulse removed. Also, the low voltage junction characteristics are stable with high temperature and radiation environments. Additionally, the level of bias on the tunnel diode determines the device impedance, which is important to insure that all of the initial charge that is transferred from the capacitance of semiconductor goes into the tunnel diode capacitance. This property gives a minimum voltage droop since the charge in the capacitor system is not shunted through an impedance, and lost as work (i.e. $I^2R$ losses). At the new logic state, the tunnel diode has a low impedance equal to the dynamic impedance of the diffusion junction. This low impedance helps to discharge the capacitor system of all its remaining stored charge so that if the tunnel diode is reset properly, the next charge pulse may be analyzed.

Figure 4:
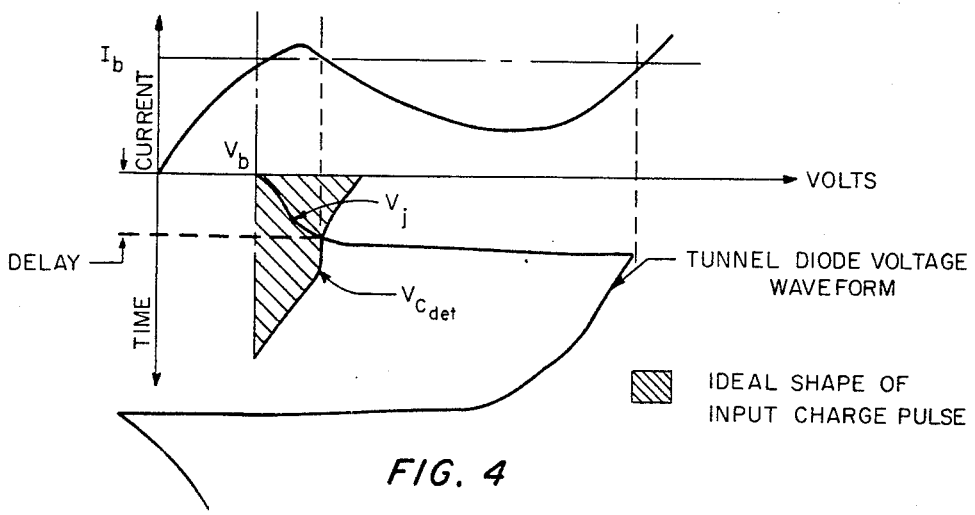
FIGURE 4 is a graphic illustration of a tunnel diode having constant current bias in which current delay and time are plotted against volts to show that an input pulse duration only has to last as long as the tunnel diode takes to have its regenerative current greater than the DC bias current.
Figure 5:
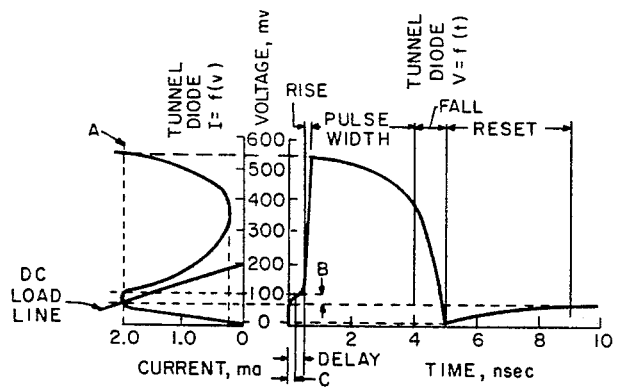
FIGURE 5 is a graphic illustration of the tunnel diode transfer characteristics describing a monostable (univibrator) waveform, wherein A is the ideal AC load line for maximum charge sensitivity and B is the ideal minimum input voltage pulse amplitude for maximum charge sensitivity to trigger monostable network and C is the ideal minimum input pulse width to trigger the monostable network.

In accordance with this invention, therefore, the tunnel diode is unlike any other semiconductor device in that its inherent characteristics of speed of light logic decision mechanism is utilized for minimum charge detection in a charge limited system. Moreover, by utilizing a constant current bias circuit configuration as described in more detail hereinafter, the pulse duration only has to last as long as the tunnel diode takes to have its regenerative current greater than the DC bias current, as shown in FIG. 4. The input pulse can then be removed at this time and the device, through regeneration, will continue in its new logic state without further drive current. Moreover, as long as the series resistance, series inductance and stray current paths are kept to a minimum, all the charge from the detector capacitor goes into the junction capacitance and the input charge pulse can have a very narrow pulse width. The tunnel diode transfer characteristics are shown in FIG. 5, wherein is illustrated a monostable (univibrator) waveform.

Figure 6:
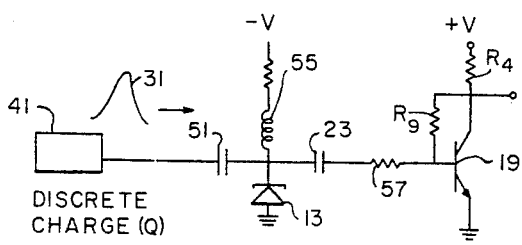
FIGURE 6 is a partial schematic illustration of the operation of the system of this invention.

Referring now to FIG. 6 the tunnel diode 13 of this invention is connected to a transistor 19 through capacitor 23. To this end the tunnel diode is not used to speed up the action of the transistor 19 but is used to detect the charge 31 from a contoured multiplying charge particle detector 41. The charge is directed into the junction capacitance of the tunnel diode 13 from detector 41 by forcing all the other charge paths to have a higher impedance. The inductor 55 is sized to look momentarily as a high impedance and the resistor 57 is chosen to have a sufficiently high value to prevent charge from going into the base-emitter and base-collector capitance of transistor 19. Thus this resistor 57 does not allow the transistor 19 to switch as fast as the tunnel diode 13 and it functions to monitor the switching action of the tunnel diode 13. Advantageously, the charge detection state of the tunnel diode 13 is a negative 500 millivolt state and it switches to a negative state to pulse off transistor 19 whereby this pulsing off state of transistor 19 helps the tunnel diode 13 to detect the small charge 31.

Figure 7:
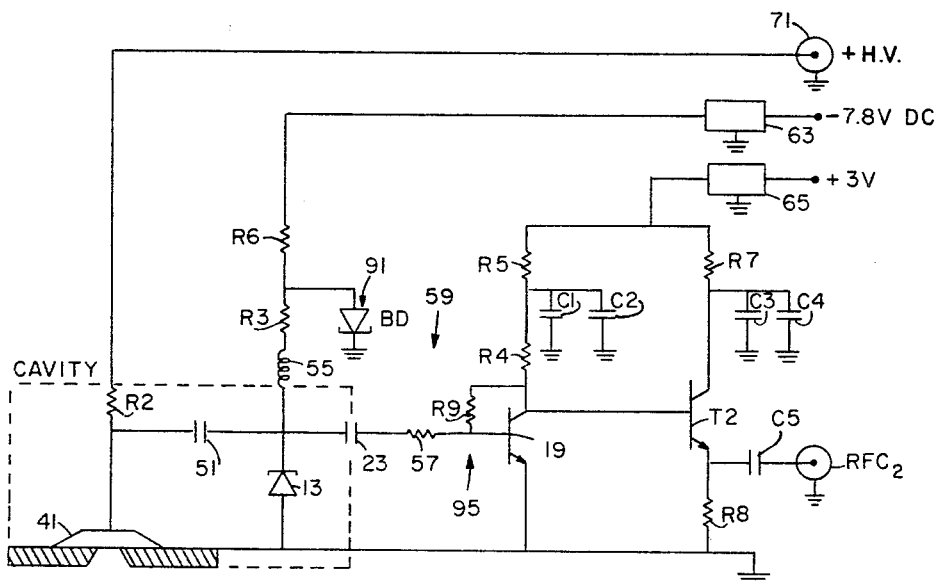
FIGURE 7 is a partial schematic circuit drawing of one embodiment of the system of this invention.

A practical arrangement for the conditions described, is shown in FIG. 7, wherein the tunnel diode 13 is a voltage biased, inductive reset, monostable oscillator logic element 13. The value of the inductor 55 maintains a constant circuit current situation while the tunnel diode 13 switches to new a voltage level state. This makes the bias circuit 59 look like an infinite impedance to the tunnel diode 13. The load on the tunnel diode 13 is a capacitively coupled forward biased silicon 2N709 transistor 19. This transistor 19 is pulsed off by the switching action of the tunnel diode 13 to its high voltage state. High voltage capacitor 51 is sandwiched between the tunnel diode 13 and semiconductor 41. Suitable circuit elements are illustrated in the following table:

TABLE I

*Resistors—¼ w. carbon-comp.*

| | Ohms |
|---|---|
| 57 | 470 |
| $R_2$ | 1M |
| $R_3$ | 47 |
| $R_4$ | 1K |
| $R_5$ | 330 |
| $R_6$ | 300 |
| $R_7$ | 47 |
| $R_8$ | 620 |
| $R_9$ | 33K |

*Transistors*

| | |
|---|---|
| 19 | 2N709 |
| $T_2$ | 2N709 |
| 13 (tunnel diode) | 251A |
| BD (back diode) | BD 3 |

*Capacitors*

| | | |
|---|---|---|
| $C_1$ | pf | 12.00 |
| $C_2$ | µf | 1 |
| $C_3$ | pf | 1200 |
| $C_4$ | µf | 1 |
| $C_5$ | µf | 1 |
| 23 | pf | 10,000 |

*Inductor*

15—10 µhenries

*Connectors*

| | |
|---|---|
| 71 | Microdot 31–50. |
| $RFC_2$ | Do. |
| 63 | Culton MF–102. |
| 65 | Do. |

Figure 8:
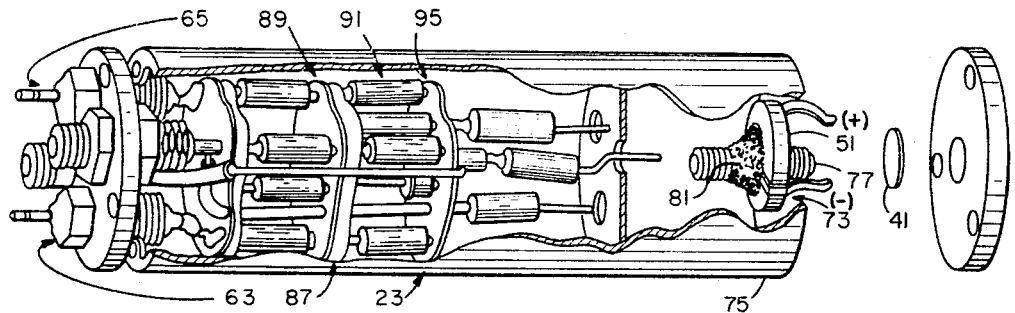
FIGURE 8 is a partial three dimensional view of an actual embodiment of the elements of FIGURE 7.

One mechanical configuration of the contoured detector, high voltage capacitor 51 and tunnel diode 13 that meets the criteria of low series inductance and low stray capacitance is obtained by the sandwich construction shown in FIG. 8. This sandwiched tunnel diode assembly 73 is held by gold plated aluminum cavity case 75 having electrical connections orientated at right angles to the ground plane. The small bellows 77 forms the contact from the capacitor 51 to the contoured semiconductor 41. Plastic cement 81 encases the tunnel diode 13 to one side of the capacitor 51. Positive and negative voltages enter case 75 through low pass filters 63 and 65 to obtain good electrical noise filtering. The electrical parts mount on double sided printed circuit boards 87 having one ground plane side 89. A rectifier 91, which acts as a millivolt Zener for further voltage filtering, provides for biasing the tunnel diode at low voltage. Capacitor C3 supplies the drive current for the emitter follower circuit T2, as shown in FIG. 7, this capacitor further filtering the transients due to the high current pulses from semiconductor 41. The entire unit weighs one ounce, is about two inches long and ¾ inch round and has a volume of one cubic inch. The power requirement is ~150 milliwatts.

In actual tests the described contoured detector, tunnel diode and circuit demonstrated sufficient sensitivity to detect a 5.9 keV$^{55}$ Fe characteristic X-ray. Initial experiments utilized 5 mev. incident alpha particles with the contoured detector bias reduced to 50 volts to increase the window thickness. Under these conditions with only 200 kev. detector output, tunnel diode threshold detection was still obtained. Next, the 5.9 keV$^{55}$ Fe X-ray was made incident, with amplifying voltage of 1750 volts then used to demonstrate the threshold detection capability. The contoured detector had been previously calibrated in air to have a 485 kev. equivalent output for an incident energy of 5.9 kev. X-ray. This represents multiplication of approximately 82. The tunnel diode was biased to give charge threshold sensitivity of $2.2 \times 10^{-14}$ coulombs. This is the calculated minimum sensitivity obtained through the following equation:

$$Q = \frac{\text{Electron volts}}{3.5 \text{ ev/pair}} = 1.6 \times 10^{-19} \text{ coulombs/electron}$$

$$= \frac{485 \times 10^{-3}}{3.5} = 1.6 \times 10^{-19}$$

$$= 2.2 \times 10^{-19} \text{ coulombs}$$

This low value is much lower than was expected could be achieved and was entirely unobvious from the prior art. Moreover, the output of the instrument delivers a 1 volt pulse on a 50 ohm line with a pulse width of approximately 60 nanoseconds.

In operation an energetic moving particle enters contoured solid-state element 41 wherein the particle slows or stops to give up kinetic energy to produce ionization in the element 41. High voltage source 71 biases this element 41 to provide an electric field strength that is sufficiently large and spatially extended in the element 41 to produce controlled cascades of holes and electrons and direct amplification of the charge liberated initially as a result of the slowing down with ionization of the incident particle. This amplification produces an output pulse corresponding to the input particle energy, the pulse lasting long enough for the tunnel diode to have its regenerative current greater than its DC constant bias current from circuit 59, which biases the tunnel diode 13 to detect small pulses, e.g. $2.2 \times 10^{-14}$ coulombs. The pulse is then removed and the tunnel diode 13, through regeneration, continues to its new monostable logic state without further drive current and is inductively reset for further pulses. Meanwhile, the value of inductor 55 maintains a constant circuit current while the tunnel diode is switching to its new voltage level state whereby the bias circuit 59 looks like an infinite impedance to the tunnel diode. Moreover, the series resistance, series inductance and stray current paths are minimized by the described direct coupling, gold plated container 75 and simple connections whereby most of the charge from the detector capacitor goes into the junction capacitance and the input charge pulse has a very narrow pulse width.

In review of the above, this invention comprises a unique assembly of charge multiplying contoured detector and a tunnel diode. The sensitivity is enhanced by the assembly geometry which keeps the series inductance and stray capacitance to a minimum. Excellent stability of small charge sensitivity is obtained by proper electrical filtering and enhanced signal to noise ratio obtained through the charge multiplication process. No other system known heretofore can duplicate the sensitivity and high speed of this device. Specific desired tunnel diode characteristics achieved, comprise small junction capacitance, low $I_p$ current that keeps the diode impedance high at the bias point i.e. $rj = \Delta V_j / \Delta I_j$ and low inductance packaging. Specific desired multiplying contoured detector characteristics achieved, comprise capacitance greater than the tunnel diode with total capacitance in the two elements small and circuit voltage high, and a series resistance, $r_d$, equal to a value so that $r_d C_{det} \geq 10 C_j (-R_j)$ so that the detector capacitor does not look like a load to the tunnel diode as its regenerative current switches the tunnel diode capacitance to its high voltage state.

This invention has the advantage of providing an amplifying detector-tunnel diode combination having application in fast timing, large detector arrays, medical probes and/or space and laboratory systems where ionizing charged particles must be detected and/or identified. Moreover, it is practical, economic, compact, simple, light in weight and useful in high magnetic fields and rotation and high temperature environments. Also, it provides an enhanced signal to noise ratio through selective charge multiplication over prior known devices, low total circuit capacitance, and high speed logic decision mechanism inherent in the tunnel diode. This system provides, for example, a charge detection system that has a decision mechanism of 60 nanoseconds or less, a change in logic state upon detection of a small discrete coulomb charge of as little as $2.2 \times 10^{-14}$ coulombs and produces pulse of one or more volts corresponding to the energy of the particle passing into the contoured semiconductor to which the tunnel diode is directly coupled. Provision is also made for providing a stable, bias circuit for the tunnel diode and contoured detector of this invention.

What is claimed is:
1. An electronic device for detecting incident radiation comprising:
    (a) incident radiation detector means having a first semiconductor with first p and n regions separated by a first charge depletion region into which said incident radiation passes to produce an avalanche multiplication of minority carriers that provides a pulse corresponding in amplitude to the energy of said radiation passing into said first charge depletion region;
    (b) tunnel diode means having a second semiconductor formed with second p and n regions separated by a second charge depletion region forming a potential barrier between said second p and n regions having a thickness of less than one millionth of an inch; and
    (c) capacitor means having a bellows connecting said radiation detector means and said capacitor means in close proximity for communicating said pulse to said tunnel diode means for the large direct amplification of said pulse by said tunnel diode means.

References Cited
UNITED STATES PATENTS

| | | | |
|---|---|---|---|
| 2,737,579 | 3/1956 | Wehrlin et al. | 317—101 |
| 3,093,805 | 6/1963 | Osifchin et al. | |
| 3,254,218 | 5/1966 | Hopkinson | 250—83.3 X |
| 3,293,435 | 12/1966 | Huth | 250—83.3 |
| 3,320,419 | 5/1967 | Thomas et al. | 250—83.3 X |

RALPH G. NILSON, *Primary Examiner.*

M. J. FROME, *Assistant Examiner.*